INVENTOR
LARS RINGDAL

Feb. 19, 1963 L. RINGDAL 3,077,635
APPARATUS FOR MOLDING A HOLLOW THERMOPLASTIC ARTICLE
Filed Dec. 18, 1959

INVENTOR
LARS RINGDAL

United States Patent Office 3,077,635
Patented Feb. 19, 1963

3,077,635
APPARATUS FOR MOLDING A HOLLOW THERMOPLASTIC ARTICLE
Lars Ringdal, Oslo, Norway, assignor to Vasco Industries Corporation, New York, N.Y.
Filed Dec. 18, 1959, Ser. No. 860,564
Claims priority, application Norway Dec. 20, 1958
9 Claims. (Cl. 18—26)

The present invention relates to the moulding of plastic articles, particularly larger selfsustaining articles, wherein the moulding is effected in that way that a mould which corresponds to the shape of the article to be molded, is filled with plastic material (plastic powder) and is inserted in an oven. An even heating of the mould is provided for, so that a layer of plastic material on the inside of the mould is melted. When the desired thickness of the layer is reached, it has been usual that the mould is taken out of the oven and opened, and subsequently excess plastic material is discharged. Means have also been proposed for emptying the mould while the latter is still inside the oven.

The present invention has for its object to provide means which make it possible to effect the moulding more rapidly and in a more efficient way than previously, so that for example a plurality of moulds simultaneously may be subjected to a treatment in the oven, as above described.

With this object in view and according to a main feature of the invention, a holder is provided adapted to hold fast a mould and convey the same to, through and from the oven, and having a circular circumference, so that the holder may be rolled for conveying the mould, and rotating the same in the oven.

The oven may have such a length that the same can accommodate a plurality of moulds in succession, and is internally provided with means by which each holder together with the mould may be moved one step further as the heat treatment proceeds. For this purpose along the length of the oven a plurality of rotatable rollers are provided, which two and two serve to support and rotate a mould, and between which members are provided which are operated for example by cam or eccentric action and serve to lift and roll the holder onto the next pair of rollers respectively out of the oven.

Examples of arrangements according to the invention are diagrammatically illustrated in the drawings, in which.

Figure 1:
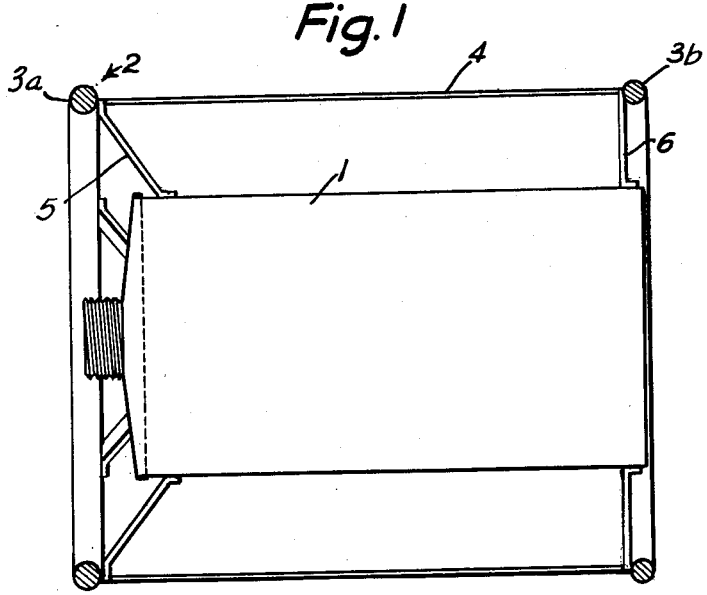
FIGS. 1 and 2 are a side view and end view respectively of a mould holder in which the mould is inserted.
Figure 2:
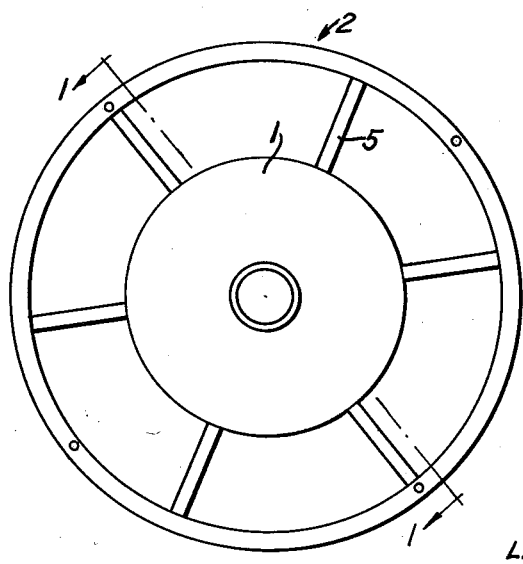

In FIG. 1, 1 designates the mould for moulding a plastic container having a circular cross-section. Each mould is provided with a charge of the powder to be molded and is placed within a rollable holder 2 having a circular configuration defined by rings 3a and 3b, preferably of metal, which are spaced apart by means of connecting rods or stays 4. To the rings 3a and 3b, radially inwards extending arms or spokes 5 and 6 respectively are secured, by means of which the mould 1 is held fast in the middle of the holder composed by the elements above described.

Figure 3:
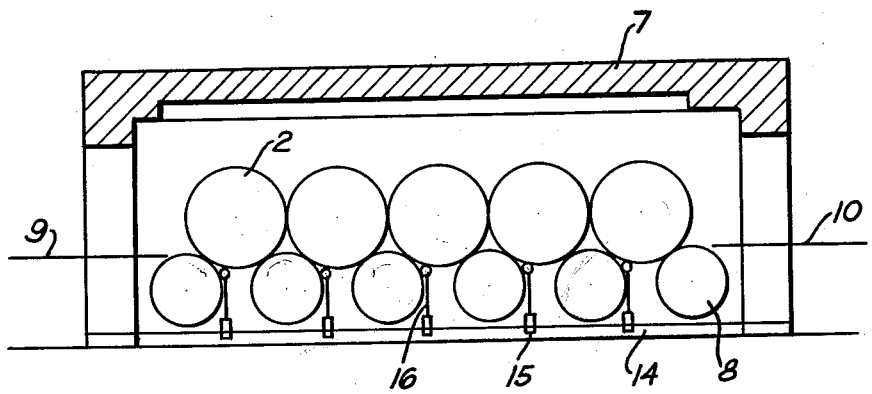
FIGS. 3 and 4 illustrates an oven with means according to the invention, in longitudinal section and cross-section respectively.
Figure 4:
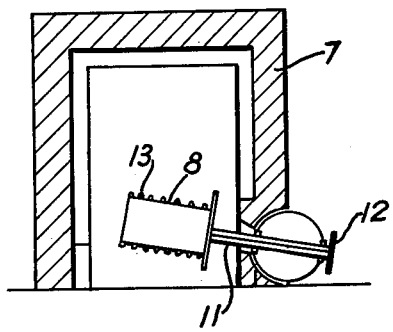

In FIGS. 3 and 4, 7 designates an oven, in which in the example shown, six rollers 8 are located, of which two and two respectively serve rotatably to support a mould holder, so that here as shown, five mould holders 2 simultaneously are inside the oven, these mould holders being rolled into the oven on the plane 9 and out of the oven on the plane 10. Each of the rollers 8 is secured at one end thereof in cantilevered manner to one end of a shaft 11 which extends through an opening in a longitudinal side wall of the oven and is rotatable from outside the oven by driving means which suitably are common for all the shafts, and are indicated at 12, FIG. 4. The rollers 8 are as indicated in FIG. 4, provided with beads or the like 13 for obtaining a certain engagement with the mould holders.

Mounted at the bottom of the oven is a rotatable shaft 14 which is provided with a number of eccentrics 15 located between two and two rollers 8 and in association with vertically movable lifting members 16, the upper end of each of which engages the lower surface of one of the holders eccentrically, i.e., to one side thereof, nearer to one of the two rollers supporting the holder than to the other of these two, so that when the shaft 14 rotates, the member 16 serves to lift the holders 2 and at the same time exert a turning moment on the latter, whereupon each holder is rolled one step further, i.e. from the forward of the two rollers over the backward of the two to the next pair of rollers, of which the backward roller is a part or, when the last two rollers are concerned, over the backward of the two onto the plane 10 for conveyance out from the oven. Thus each mould may in each stage be subjected to a heat treatment of for example one minute, and then rolled further to the next stage.

As it appears from FIG. 4, each shaft 11 together with the roller 8 cantilevered thereon pivotally mounted in such a way that the roller may be rocked upwards or downwards and set in various positions relative to the horizontal, so that the mould may be positioned at any of various inclinations relative to the horizontal for the purpose, for example, of regulating the heating conditions or the distribution of molding material in the mold so as, for example, to obtain a larger or smaller thickness of the plastic layer at the one or the other end of the mould. For this purpose the whole oven may stand on an angularly adjustable cradle, so that the whole arrangement can be positioned with an inclination relative to the horizontal plane.

I claim:

1. Apparatus for molding hollow articles from thermoplastic materials, comprising:
    a horizontally elongated oven;
    a multiplicity of rollable holders each having a circular circumference and formed to receive and carry therewithin one of a multiplicity of molds conforming to the shape of said articles;
    a multiplicity of rollers regularly spaced apart along and extending transversely of said oven in a parallel arrangement by which every two of said rollers forms within the oven a molding station at which one of said holders is supportable rollably on and between the two rollers at the upper side thereof, the number of said stations being one less than the number of said rollers;
    means for rotating said rollers to keep the holders thereon and the molds within the holders in rolling movement;
    vertically movable lifting means at each of said stations for engaging eccentrically the under side of a holder on the two rollers of the station at a location nearer to the forward roller thereof than to the backward roller thereof, and means for moving said lifting means upwardly in eccentric engagement with said under side so as to push and roll the engaged holder over such backward roller to the next station.

2. Apparatus for molding hollow articles from thermoplastic materials, comprising:
    a horizontally elongated oven;
    a multiplicity of rollable holders each having a circular circumference and formed to receive and carry therewithin one of a multiplicity of molds conforming to the shape of said articles;

a multiplicity of rollers regularly spaced apart along and extending transversely of said oven in a parallel arrangement by which every two of said rollers forms within the oven a molding station at which one of said holders is supportable rollably on and between the two rollers at the upper side thereof, the number of said stations being one less than the number of said rollers;

means for rotating said rollers to keep the holders thereon and the molds within the holders in rolling movement;

vertically movable lifting means at each of said stations for engaging eccentrically the under side of a holder on the two rollers of the station at a location nearer to the forward roller thereof than to the backward roller thereof, and means for moving said lifting means upwardly in eccentric engagement with said under side so as to push and roll the engaged holder over such backward roller to the next station;

and intermittently operative means for actuating said means for moving said lifting means of the several stations simultaneously so as to advance all the holders within the oven a step therealong at regular intervals.

3. The apparatus of claim 2, said intermittently operative means comprising a common rotary shaft extending lengthwise of the oven and having eccentrics spaced apart on said shaft, the eccentrics constituting said means for moving the respective lifting means.

4. The apparatus of claim 2, said oven having at its forward end a door and means upon which said holders may be rolled successively through the door and over the foremost of said rollers to the first of said stations, and having at its backward end another door and means to receive and roll through the other door each holder rolled over the backward roller of the last of the said stations.

5. The apparatus of claim 1, wherein each of said holders comprises parallel spaced rings, a plurality of stays interconnecting the rings at spaced points about their circumference, and a multiplicity of spokes extending radially inwardly from each of said rings and defining at their inner ends an axially elongated chamber for receiving and centering the mold in the holder.

6. Apparatus for molding hollow articles from thermoplastic materials, comprising:

a horizontally elongated oven;

a multiplicity of rollable holders each having a circular circumference and formed to receive and carry therewithin one of a multiplicity of molds conforming to the shape of said articles;

a multiplicity of rollers spaced apart along and extending transversely of said oven in a parallel arrangement forming within the oven a succession of molding stations at each of which one of said holders is supportable rollably on and between two of said rollers at the upper side thereof;

means for rotating said rollers to keep the holders thereon and the molds within the holders in rolling movement;

and means for transferring said holders successively from one to the next of said stations and finally out of the oven;

each of said rollers being cantilevered at one end thereof on a shaft extending transversely through a longitudinal side wall of said oven.

7. Apparatus for molding hollow articles from thermoplastic materials, comprising:

a horizontally elongated oven;

a multiplicity of rolable holders each having a circular circumference and formed to receive and carry therewithin one of a multiplicity of molds conforming to the shape of said articles;

a multiplicity of rollers spaced apart along and extending transversely of said oven in a parallel arrangement forming within the oven a succession of molding stations at each of which one of said holders is supportable rollably on and between two of said rollers at the upper side thereof;

means for rotating said rollers to keep the holders thereon and the molds within the holders in rolling movement;

and means for transferring said holders successively from one to the next of said stations and finally out of the oven;

each of said rollers being cantilevered at one end thereof on a shaft extending transversely through a longitudinal side wall of said oven, and the roller shafts having on their ends outside the oven driving means whereby they may be rotated in unison.

8. The apparatus of claim 7, said roller shafts being supported an cradle means adjustably angularly about a horizontal axis and relative to said side wall, whereby said rollers may be set at any of a variety of inclinations relative to the horizontal to incline correspondingly the holders and molds processed thereon.

9. Apparatus for molding hollow articles from thermoplastic materials, comprising:

a horizontally elongated oven;

a multiplicity of rollable holders each having a circular circumference and formed to receive and carry therewithin one of a multiplicity of molds conforming to the shape of said articles;

a multiplicity of rollers regularly spaced apart along and extending transversely of said oven in a parallel arrangement by which every two of said rollers forms within the oven a molding station at which one of said holders is supportable rollably on and between the two rollers at the upper side thereof, the number of said stations being one less than the number of said rollers.

means for rotating said rollers to keep the holders thereon and the molds within the holders in rolling movement;

vertically movable lifting means at each of said stations for engaging eccentrically the under side of a holder on the two rollers of the station at a location nearer to the forward roller thereof than to the backward roller thereof, and means for moving said lifting means upwardly in eccentric engagement with said under side so as to push and roll the engaged holder over such backward roller to the next station;

each of said rollers being cantilevered at one end thereof on a shaft extending transversely through a longitudinal side wall of said oven, and the roller shafts having on their ends outside the oven driving means whereby they may be rotated in unison.

References Cited in the file of this patent

UNITED STATES PATENTS

| 1,303,889 | Gruenfeld | May 20, 1919 |
| 1,531,342 | Mair et al. | Mar. 31, 1925 |
| 1,771,099 | Righetto | July 22, 1930 |
| 1,785,586 | Hume | Dec. 16, 1930 |
| 2,043,956 | Camerota | June 9, 1936 |
| 2,189,071 | Kopp | Feb. 6, 1940 |
| 2,349,213 | Van Niekerk | May 16, 1944 |
| 2,790,997 | Kurtz | May 7, 1957 |
| 2,859,151 | Usab et al. | Nov. 4, 1958 |

FOREIGN PATENTS

| 559,864 | Canada | July 1, 1958 |